United States Patent
Mouler et al.

(10) Patent No.: US 9,389,672 B2
(45) Date of Patent: Jul. 12, 2016

(54) QUALITY-OF-SERVICE MANAGEMENT IN POWER-THROTTLED STORAGE DEVICES

(71) Applicant: Apple Inc., Cupertino, CA (US)

(72) Inventors: Stas Mouler, Kfar Saba (IL); Avraham Poza Meir, Rishon Le-Zion (IL)

(73) Assignee: Apple Inc., Cupertino, CA (US)

(*) Notice: Subject to any disclaimer, the term of this patent is extended or adjusted under 35 U.S.C. 154(b) by 217 days.

(21) Appl. No.: 14/219,285

(22) Filed: Mar. 19, 2014

(65) Prior Publication Data
US 2015/0268712 A1  Sep. 24, 2015

(51) Int. Cl.
*G06F 1/00* (2006.01)
*G06F 1/32* (2006.01)
*G06F 3/06* (2006.01)
*G06F 9/50* (2006.01)
*G06F 12/08* (2016.01)

(52) U.S. Cl.
CPC .............. *G06F 1/325* (2013.01); *G06F 1/3225* (2013.01); *G06F 1/3203* (2013.01); *G06F 1/3221* (2013.01); *G06F 1/3268* (2013.01); *G06F 1/3275* (2013.01); *G06F 1/3287* (2013.01); *G06F 3/0601* (2013.01); *G06F 3/0611* (2013.01); *G06F 3/0625* (2013.01); *G06F 3/0653* (2013.01); *G06F 3/0659* (2013.01); *G06F 3/0673* (2013.01); *G06F 9/5016* (2013.01); *G06F 12/0866* (2013.01)

(58) Field of Classification Search
CPC ... G06F 1/3203; G06F 1/3225; G06F 1/3275; G06F 3/0625; G06F 3/0653; G06F 3/0659
USPC ................................. 713/300, 320, 322, 323
See application file for complete search history.

(56) References Cited

U.S. PATENT DOCUMENTS

| | | | |
|---|---|---|---|
| 6,906,811 B1 * | 6/2005 | Teradaira | G06F 3/1203 358/1.13 |
| 2010/0169603 A1 * | 7/2010 | Perry | G06F 3/0611 711/167 |
| 2010/0287314 A1 * | 11/2010 | Perry | G06F 3/0611 710/25 |
| 2012/0331207 A1 | 12/2012 | Lassa et al. | |

* cited by examiner

*Primary Examiner* — Michael J Brown
(74) *Attorney, Agent, or Firm* — Meyertons, Hood, Kivlin, Kowert & Goetzel, P.C.

(57) ABSTRACT

A method includes, in a host that stores data in a storage device, instructing the storage device to operate in a power throttling mode that limits power consumption of the storage device to a selected power limit. Storage commands are generated in the host for execution by the storage device, wherein each of at least some of the storage commands is partitioned into multiple sub-commands having a maximal size that depends on the selected power limit. The sub-commands are sent for execution in the storage device.

8 Claims, 2 Drawing Sheets

QUALITY-OF-SERVICE MANAGEMENT IN POWER-THROTTLED STORAGE DEVICES

FIELD OF THE INVENTION

The present invention relates generally to data storage, and particularly to methods and systems for storage in power-throttled storage devices.

BACKGROUND OF THE INVENTION

Some data storage systems occasionally limit the maximum power that a storage device is permitted to consume, even at the expense of performance degradation. This sort of operation is referred to as power throttling. Various techniques for power throttling of storage devices are known in the art. For example, U.S. Patent Application Publication 2012/0331207, whose disclosure is incorporated herein by reference, describes a controller in a storage device having multiple Flash memory devices. The controller determines how much power will be consumed by each of a plurality of commands and dynamically alters when each of the commands operating on one or more of the Flash memory devices is performed based on the determination of how much power would be consumed, so that performance of the plurality of commands does not exceed a predetermined average power limit over a period of time.

SUMMARY OF THE INVENTION

An embodiment of the present invention that is described herein provides a method including, in a host that stores data in a storage device, instructing the storage device to operate in a power throttling mode that limits power consumption of the storage device to a selected power limit. Storage commands are generated in the host for execution by the storage device, wherein each of at least some of the storage commands is partitioned into multiple sub-commands having a maximal size that depends on the selected power limit. The sub-commands are sent for execution in the storage device.

In some embodiments, instructing the storage device to operate in the power throttling mode includes selecting the power limit from a set of predefined power limits associated with respective maximal sizes, and generating the storage commands includes producing the sub-commands with sizes that do not exceed the maximal size corresponding to the selected power limit. In an embodiment, generating the storage commands includes modifying the maximal size of the sub-commands in response to a change in the power limit.

There is additionally provided, in accordance with an embodiment of the present invention, apparatus including an interface and a processor. The interface is configured for communicating with a storage device. The processor is configured to instruct the storage device via the interface to operate in a power throttling mode that limits power consumption of the storage device to a selected power limit, to generate storage commands for execution by the storage device, wherein each of at least some of the storage commands is partitioned into multiple sub-commands having a maximal size that depends on the selected power limit, and to send the sub-commands via the interface for execution in the storage device.

There is also provided, in accordance with an embodiment of the present invention, a method including receiving in a storage device storage commands from a host. Time durations, which will be needed for executing the respective storage commands, are predicted in the storage device. The host is notified of the predicted time durations. In an embodiment, the method includes, in the host, regulating sending of subsequent storage commands to the storage device based on the predicted time durations.

There is further provided, in accordance with an embodiment of the present invention, a storage device including an interface and a processor. The interface is configured for communicating with a host. The processor is configured to receive storage commands from the host, to predict respective time durations that will be needed for executing the storage commands, and to notify the host of the predicted time durations.

There is additionally provided, in accordance with an embodiment of the present invention, a system including a storage device and a host. The storage device is configured to receive over an interface storage commands for execution, to predict respective time durations that will be needed for executing the storage commands, and to send over the interface a notification of the predicted time durations. The host is connected to the storage device via the interface and is configured to regulate sending of subsequent storage commands to the storage device based on the predicted time durations.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for data storage in power-throttled storage devices. In the disclosed embodiments, a memory system comprises a host that sends storage commands for execution in a storage device, e.g., a Solid State Drive (SSD). Under certain circumstances, the host may decide to limit the power consumption of the storage device to a predefined power limit, even at the expense of performance degradation. The system may define one or more power throttling states, i.e., one or more trade-offs of power consumption vs. storage performance.

In order to maintain adequate Quality-of-Service (QoS), the host may partition long storage commands into shorter sub-commands. This technique helps, for example, to avoid scenarios in which one storage command is delayed for a long time period due to execution of another, lengthy storage command.

In some embodiments that are described herein, the host sets the maximal sub-command size depending on the power consumption limit set for the storage device. Typically, when the storage device is heavily throttled (i.e., severely limited in power consumption) the host will generate shorter sub-commands, and vice versa. The rationale behind this technique is that a severely power-limited storage device is more likely to incur long processing delays due to its limited performance, and therefore finer partitioning of storage commands is warranted. When power throttling is less severe, longer sub-commands may be sufficient to maintain the desired QoS, and the overhead associated with partitioning can be reduced.

In other embodiments, the storage device predicts the time duration it expects to require for processing each queued storage command. Put in another way, the storage device predicts the times at which it expects to complete each queued storage command. The storage device reports the predicted times or durations to the host, and the host uses this information in scheduling subsequent storage commands. This technique provides the host with more insight as to the actual processing capabilities and status of the storage device. As such, the host is able to better regulate sending of storage commands to the storage device in order to maintain adequate QoS.

System Description

Figure 1:
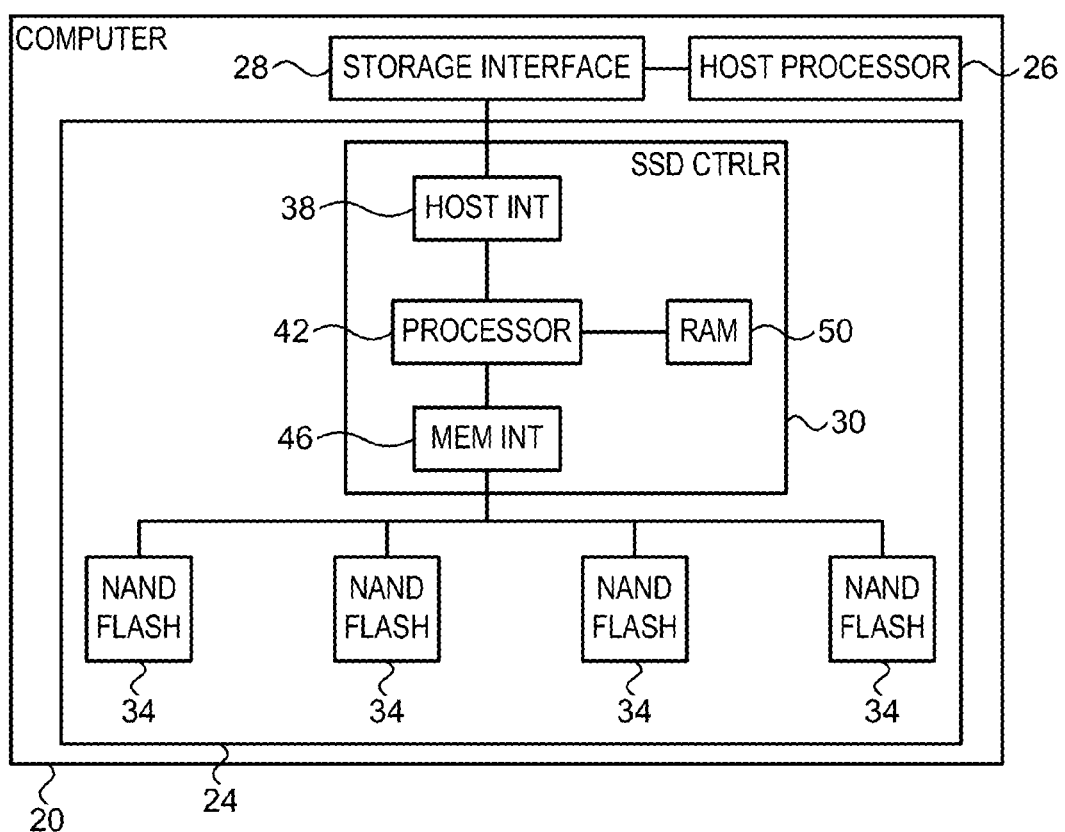
FIG. 1 is a block diagram that schematically illustrates a memory system, in accordance with an embodiment of the present invention.

FIG. 1 is a block diagram that schematically illustrates a memory system, in accordance with an embodiment of the present invention. In the present example, the memory system comprises a computer 20 that stores data in a Solid state Drive (SSD) 24. Computer 20 may comprise, for example, a mobile, tablet or personal computer.

In alternative embodiments, the host may comprise any other suitable processor or controller, and the storage device may comprise any other suitable device. For example, the host may comprise a storage controller of an enterprise storage system, and the storage device may comprise an SSD or an array of SSDs. Other examples of hosts that store data in non-volatile storage devices comprise mobile phones, digital cameras, media players and removable memory cards or devices.

In the example of FIG. 1, computer 20 comprises a host processor 26 that communicates with SSD 24 using a storage interface 28. Host processor 26 typically runs a suitable Operating System (OS) that, among other tasks, issues storage commands for execution by the SSD. Storage commands may comprise, for example, commands for reading data from one or more memory addresses and commands for writing data to one or more memory addresses.

SSD 24 stores data for host processor 26 in a non-volatile memory, in the present example in one or more NAND Flash memory devices 34. In alternative embodiments, the non-volatile memory in SSD 24 may comprise any other suitable type of non-volatile memory, such as, for example, NOR Flash, Charge Trap Flash (CTF), Phase Change RAM (PRAM), Magnetoresistive RAM (MRAM) or Ferroelectric RAM (FeRAM).

An SSD controller 30 performs the various storage and management tasks of the SSD. The SSD controller is also referred to generally as a memory controller. SSD controller 30 comprises a host interface 38 for communicating with host processor 26, a memory interface for communicating with Flash devices 34, and a processor 42 that carries out the various processing tasks of the SSD.

SSD 24 further comprises a volatile memory, in the present example a Random Access Memory (RAM) 50. In the embodiment of FIG. 1, RAM 50 is shown as part of SSD controller 30, although the RAM may alternatively be separate from the SSD controller. RAM 50 may comprise, for example, a Static RAM (SRAM), a Dynamic RAM (DRAM), a combination of the two RAM types, or any other suitable type of volatile memory.

Host processor 26 and processor 42 of the SSD controller may be implemented in hardware. Alternatively, each of processors 26 and 42 may comprise a microprocessor that runs suitable software, or a combination of hardware and software elements.

The configuration of FIG. 1 is an exemplary configuration, which is shown purely for the sake of conceptual clarity. Any other suitable SSD or other memory system configuration can also be used. Elements that are not necessary for understanding the principles of the present invention, such as various interfaces, addressing circuits, timing and sequencing circuits and debugging circuits, have been omitted from the figure for clarity. In some applications, e.g., non-SSD applications, the functions of SSD controller 30 are carried out by a suitable memory controller.

In the exemplary system configuration shown in FIG. 1, memory devices 34 and SSD controller 30 are implemented as separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD controller circuitry may reside on the same die on which one or more of memory devices 34 are disposed. Further alternatively, some or all of the functionality of SSD controller 30 can be implemented in software and carried out by host processor 26 or other processor in the computer. In some embodiments, host processor 26 and SSD controller 30 may be fabricated on the same die, or on separate dies in the same device package.

In some embodiments, processor 42 and/or host processor 26 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

SSD Power Throttling, and Techniques for Maintaining Quality of Service

In some embodiments, host processor 26 is configured to instruct SSD 24 to operate in a power throttling mode. In this mode, the power consumption of SSD 24 is not permitted to exceed a predefined power limit. Power throttling may be used, for example, in systems with limited thermal or power envelope. For example, host processor 26 may support a set of (one or more) power throttling states, each state defining a different power consumption limit for the SSD.

SSD 24 may implement power throttling in various ways, typically by degrading the SSD performance to match the permitted power consumption. As can be appreciated, power throttling typically causes performance degradation in SSD 24. For example, a given SSD may provide a storage throughput of 1000 MB/sec during normal operation, and the throughput may degrade to 20 MB/sec when using power throttling. Power throttling may also affect other performance measures, such as latency. Unless accounted for, maintaining adequate Quality-of-Service (QoS) in the SSD under power throttling may be problematic.

In some embodiments, host processor 26 partitions at least some of the storage commands provided to SSD 24 into multiple shorter sub-commands. For example, a command that accesses (reads or writes) a large range of addresses can be partitioned into a sequence of shorter commands, each accessing a partial range of addresses.

Partitioning of storage commands provides more scheduling flexibility for the SSD, and avoids scenarios in which one storage command is delayed in the SSD for a long time period due to execution of another, lengthy storage command. Partitioning of storage commands is particularly important when the SSD operates in power throttling mode, because the SSD performance is degraded and there is a higher probability of long delays.

In some embodiments, host processor 26 sets the maximal sub-command size depending on the power consumption limit set for the storage device. Typically, when the maximum permitted power consumption is low (heavy throttling), host processor 26 produces very short sub-commands. When the maximum permitted power consumption is higher, the host processor permits longer sub-commands. For example, without power throttling the maximum sub-command size may be set to 1 MB, and with power throttling the maximum sub-command size may be set to 128 KB.

The above technique enables the host processor to optimize the partitioning operation in accordance with the depth of power throttling. When the SSD performance is degraded and long delays are expected, the host processor partitions the storage commands into short sub-commands in order to maintain adequate QoS. When power throttling is modest (or disabled), the host processor partitions the storage commands into longer sub-commands, thus reducing the overhead incurred by the partitioning.

In some embodiments, host processor 26 uses a set of power throttling modes or states, each mode specifying a different maximum power limit. In these embodiments, the host processor may hold a corresponding set of maximum sub-command sizes. When instructing the SSD to switch to a given power throttling mode, the host controller starts generating sub-commands whose size does not exceed the maximum sub-command size associated with the selected power throttling mode.

Figure 2:
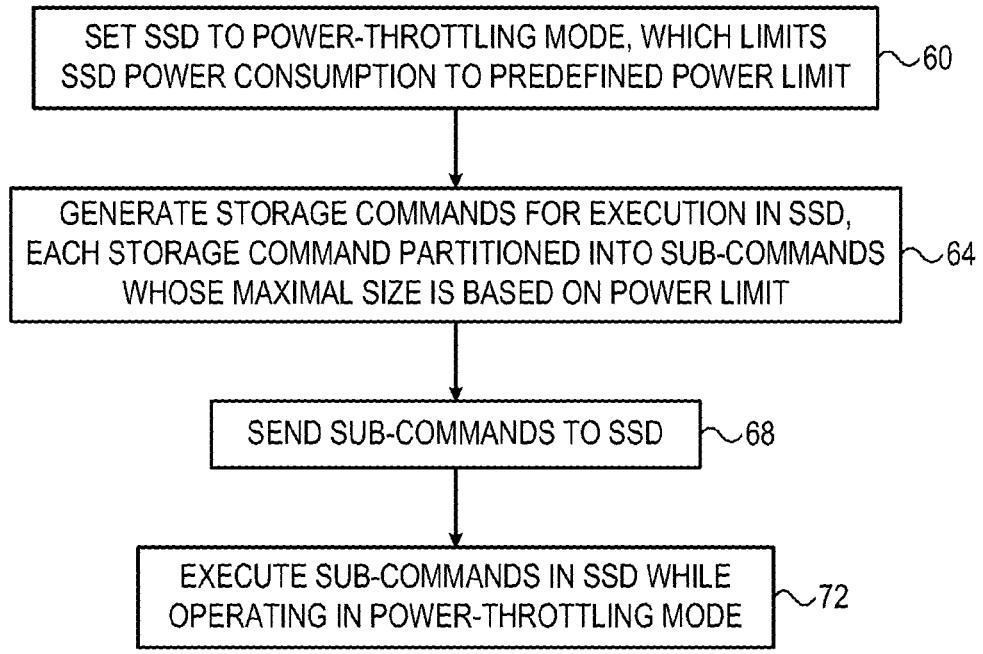
FIG. 2 is a flow chart that schematically illustrates a method for generating storage commands for an SSD that operates in a power throttling mode, in accordance with an embodiment of the present invention.

FIG. 2 is a flow chart that schematically illustrates a method for generating storage commands for SSD 24, in accordance with an embodiment of the present invention. The method begins with host processor 26 instructing SSD 24 to switch to a selected power throttling mode, at a throttling step 60.

Host processor 26 generates storage commands, at least some of which are partitioned into sub-commands, at a command generation step 64. In particular, the host processor generates sub-commands whose size does not exceed the maximum sub-command size defined for the power throttling mode selected at step 60.

Host processor 26 sends the sub-commands via interface 28 and interface 38 to processor 42 in the SSD, at a command sending step 68. Processor 42 executes the sub-commands in Flash devices 34, at an execution step 72.

In other embodiments, computer 20 improves the storage performance under power throttling by predicting the time durations that SSD controller 30 will need for performing the storage commands it receives from host processor 26. In these embodiments, processor 42 in the SSD indicates to host processor 26, the expected time duration it will need for executing each queued storage command. Processor 42 may indicate the time duration in various ways and in various granularities.

For example, processor 42 may report, for each queued storage command, the predicted time at which the processor expects to complete the command execution. As another example, processor 42 may report a coarse "small delay"/ "large delay" indication per each storage command. The predicted time duration depend, for example, on the size, type and complexity of the command, on the total work load created by other queued commands, on the available processing resources in the SSD, and on various other factors.

Host processor 26 considers the predicted time durations reported by the SSD when scheduling subsequent storage commands. For example, when the predicted time durations are long, the host processor may react by suspending or reducing the rate of subsequent storage commands. When the predicted time durations are short, the host processor may resume or increase the rate of storage commands sent to the SSD. This technique enables the host processor to maintain adequate processing latency, even though power throttling is in use.

Figure 3:
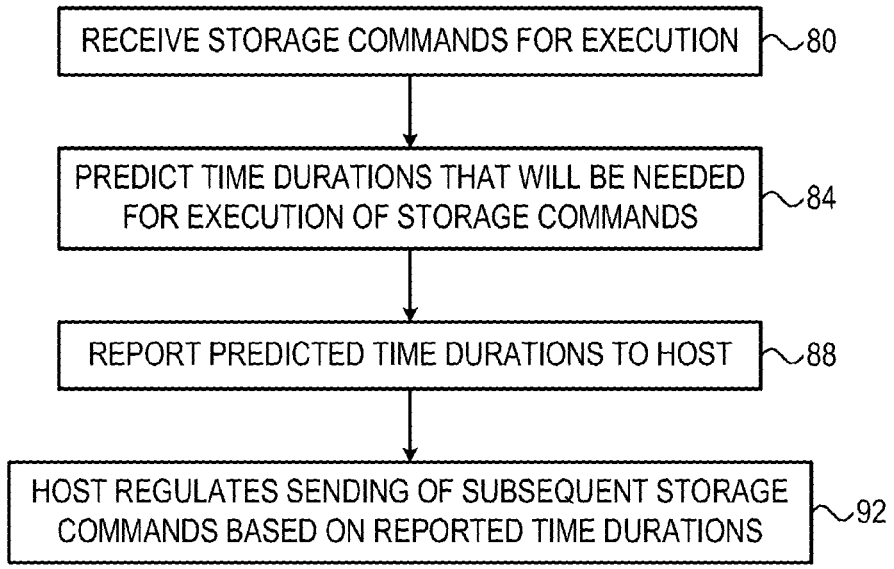
FIG. 3 is a flow chart that schematically illustrates a method for data storage in a power-throttled storage device, in accordance with an embodiment of the present invention.

FIG. 3 is a flow chart that schematically illustrates a method for data storage in SSD 24, in accordance with an embodiment of the present invention. The method begins with processor 42 in SSD 24 receiving storage commands for execution, at a command reception step 80. Processor 42 predicts the time duration that it expects to need for executing each command, at a time prediction step 84.

Processor 42 reports the predicted time durations to host processor 26, at a reporting step 88. The host processor regulates the rate of subsequent storage commands sent to the SSD based on the reported durations, at a command regulation step 92.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a host that stores data in a storage device, instructing the storage device to operate in a power throttling mode that limits power consumption of the storage device to a selected power limit;
   generating in the host storage commands for execution by the storage device, wherein each of at least some of the storage commands is partitioned into multiple sub-commands having a maximal size that depends on the selected power limit, and wherein generating the storage commands includes modifying the maximal size of the sub-commands in response to a change in the power limit; and
   sending the sub-commands for execution in the storage device.

2. The method according to claim 1, wherein instructing the storage device to operate in the power throttling mode comprises selecting the power limit from a set of predefined power limits associated with respective maximal sizes, and wherein generating the storage commands comprises producing the sub-commands with sizes that do not exceed the maximal size corresponding to the selected power limit.

3. An apparatus, comprising:
an interface for communicating with a storage device; and
a processor configured to:
- instruct the storage device via the interface to operate in a power throttling mode that limits power consumption of the storage device to a selected power limit;
- generate storage commands for execution by the storage device, wherein each of at least some of the storage commands is partitioned into multiple sub-commands having a maximal size that depends on the selected power limit; and
- send the sub-commands via the interface for execution in the storage device;

wherein to generate the storage commands for execution by the storage device, the processor is further configured to modify the maximal size of the sub-commands in response to a change in the power limit.

4. The apparatus according to claim 3, wherein the processor in configured to select the power limit from a set of predefined power limits associated with respective maximal sizes, and to produce the sub-commands with sizes that do not exceed the maximal size corresponding to the selected power limit.

5. A method, comprising:
- receiving in a storage device a plurality of storage commands from a host;
- predicting, in the storage device, a respective time duration that will be needed for executing each storage command of the plurality of storage commands, wherein each time duration includes a first delay and a second delay, and wherein a granularity of the first delay is different than a granularity of the second delay; and
- notifying the host of the predicted time durations.

6. The method according to claim 5, further comprising, in the host, regulating sending of subsequent storage commands to the storage device based on the predicted time durations.

7. A storage device, comprising:
an interface for communicating with a host; and
a processor configured to:
- receive a plurality of storage commands from the host;
- predict a respective time duration that will be needed for executing each storage command of the plurality of storage commands, wherein each time duration includes a first delay and a second delay, and wherein a granularity of the first delay is different than a granularity of the second delay; and
- notify the host of the predicted time durations.

8. A system, comprising:
a storage device configured to:
- receive via an interface a plurality of storage commands for execution;
- predict a respective time duration that will be needed for executing each storage command of the plurality of storage commands, wherein each time duration includes a first delay and a second delay, and wherein a granularity of the first delay is different than a granularity of the second delay; and
- send over the interface a notification of the predicted time durations; and a host coupled to the storage device via the interface, wherein the host is configured to regulate sending of subsequent storage commands to the storage device based on the predicted time durations.

* * * * *